US006707814B1

United States Patent
Ohgane

(10) Patent No.: US 6,707,814 B1
(45) Date of Patent: Mar. 16, 2004

(54) COMMUNICATION CONTROL APPARATUS HAVING A RECEIVING SECTION WITH AN ADDRESS FILTERING SECTION

(75) Inventor: Shoji Ohgane, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/106,012

(22) Filed: Jun. 29, 1998

(30) Foreign Application Priority Data

Jun. 30, 1997 (JP) .............................. 9-173918

(51) Int. Cl.[7] .............................................. H04L 12/56
(52) U.S. Cl. ........................................ 370/389; 370/474
(58) Field of Search ................................ 370/389, 392, 370/394, 395, 396, 398, 399, 400, 401, 409, 422, 466, 467, 474, 473, 230, 253, 235, 232

(56) References Cited

U.S. PATENT DOCUMENTS

| | | | |
|---|---|---|---|
| 5,357,510 A | * 10/1994 | Norizuki et al. ............ 370/395 |
| 5,394,402 A | * 2/1995 | Ross | |
| 5,450,406 A | 9/1995 | Esaki et al. ................. 370/60.1 |
| 5,557,609 A | 9/1996 | Shobatake et al. ......... 370/60.1 |
| 5,583,865 A | 12/1996 | Esaki et al. ................. 370/397 |
| 5,732,071 A | * 3/1998 | Saito et al. | |
| 5,872,784 A | * 2/1999 | Rostoker et al. ............ 370/395 |
| 5,946,311 A | * 8/1999 | Alexander, Jr. et al. .... 370/395 |
| 6,041,038 A | * 3/2000 | Aimoto ....................... 370/229 |

FOREIGN PATENT DOCUMENTS

| | | |
|---|---|---|
| JP | 6-311185 | 11/1994 |
| JP | 7-154395 | 6/1995 |
| JP | 7-283813 | 10/1995 |
| WO | WO 95 20282 | 7/1995 |

OTHER PUBLICATIONS

Fred Halsall, "Data Communications, Computer Networks and Open Systems, Fourth Edition, printed 1995, reprinted 1996, Addison–wesley Publishing Company".*
Newman, P, "ATM Local Area Networks, IEEE Communications Magazine, pp. 86–98, Mar. 1994, vol. 32 issue:3" discloses LAN emulation best effort, connectionless, packet transfer service at the MAC sublayer.*
Mchenry et al:"An FPGA–Based Copressor for ATM Firewalls", Annual IEEE Symposium on Firld–Programmable Custom Computing Machines, Apr. 16, 1997, pp. 30–39, XP002157218.*
Mchenry et al: "An FPGA–based coprocessor for ATM firewalls" Annual IEEE Symposium on Field–Programmable Custom Computing Machines, XX, XX, Apr. 16, 1997, pp. 30–39, XP002157218.

Primary Examiner—Dang Ton
Assistant Examiner—Inder Pal Mehra
(74) Attorney, Agent, or Firm—Foley & Lardner

(57) ABSTRACT

In a communication control apparatus comprising a receiving section which receives reception cells supplied from a network via a physical layer device and which includes a memory for selectively storing the reception cells as stored cells, the receiving section comprises an address filtering section for identifying a value of a particular address included in a payload field of a first cell for a reception packet to produce an address filtered signal indicative of an identified value. A write-in control section determines whether or not the reception packet should be received on the basis of the identified value indicated by the address filtered signal. The write-in control section writes the reception packet in the memory when the reception packet should be received. The write-in control section discards the reception packet without writing it in the memory when the reception packet should be not received.

12 Claims, 8 Drawing Sheets

OTHER PUBLICATIONS

Article —Technical Report of The Proceedings of the Institute of Electronics, Information and Communication Engineers IN97–36(Apr. 22, 1997).

Article —Technical Report of the Proceeding of The Institute of Electronics, Information and Communication Engineers IN89–66 (Sep. 22, 1989).

Article —Aramaki, et al: "Development of an ATM–based virtual LAN platform (LAN Emulation)," NEC Reports, vol.48 No. 8, pp. 21–26, NEC Created Limited, Sep. 11, 1995.

* cited by examiner

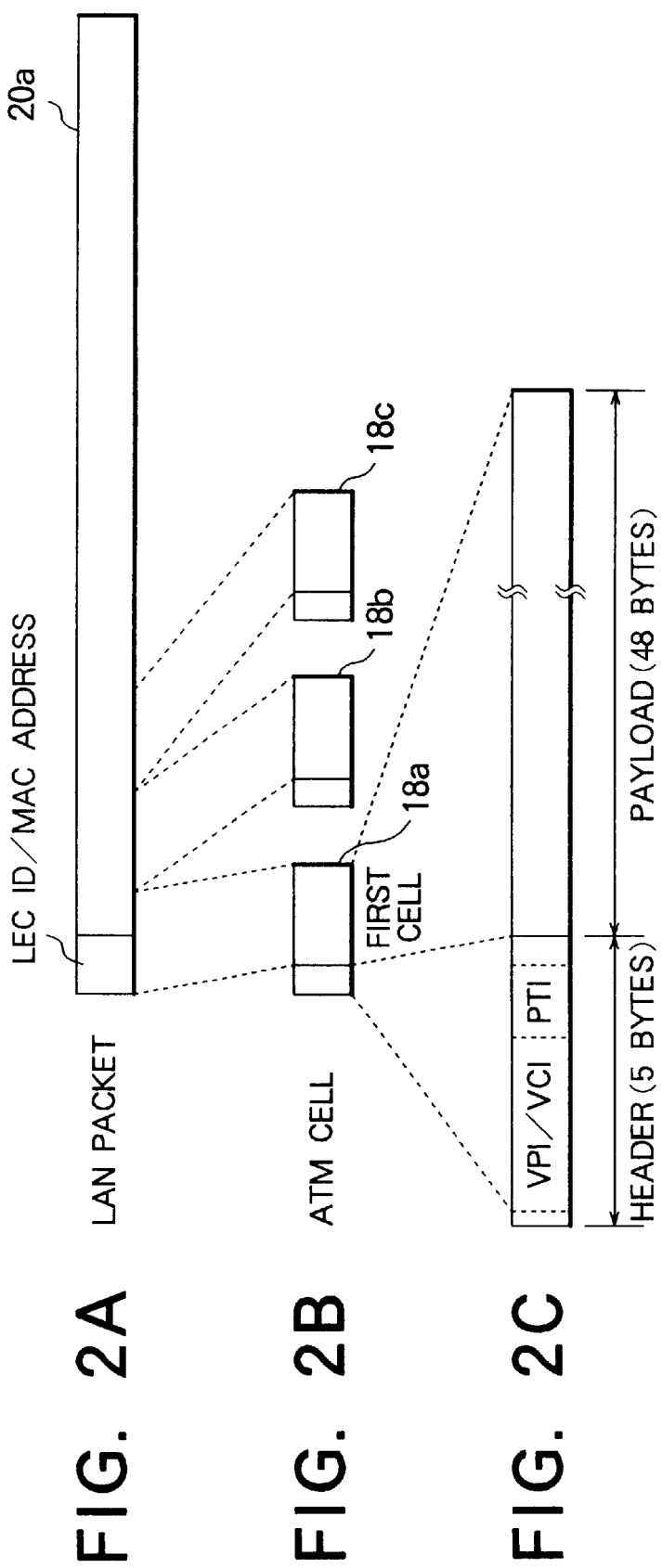

COMMUNICATION CONTROL APPARATUS HAVING A RECEIVING SECTION WITH AN ADDRESS FILTERING SECTION

BACKGROUND OF THE INVENTION

This invention relates to a communication control apparatus and, more particularly, to a communication control apparatus for use in receiving asynchronous transfer mode (ATM) cells in an ATM network system with a local area network (LAN) emulation function.

In the manner which will later be described in conjunction with FIG. 1, an ATM network system of the type described has a LAN emulation function, namely, a function which artificially carries out legacy LAN communication on an ATM network. In other words, the LAN emulation is also called MAC over ATM and emulates a legacy LAN on an ATM. The LAN may be an Ethernet, a Token Ring, or the like. That is to say, the LAN emulation is service to provide mutual connection between the legacy LAN and the ATM at a bridge level so that a legacy LAN terminal can use an ATM-LAN part just like a legacy segment. The LAN emulation has been standardized by an ATM forum.

The ATM network system with the LAM emulation function comprises an ATM network with the LAN emulation function, a plurality of legacy LAN terminals connected to the ATM network, a plurality of ATM terminals, and a plurality of ATM bridges for connecting the legacy LAN terminals with the ATM network. In this event, each ATM terminal is generally provided with an ATM communication control apparatus for transmitting and receiving ATM cells.

In the manner known in the art, it is to be noted that each of the ATM cells is composed of fifty-three bytes and has a cell header field of five bytes and a cell payload field of forty-eight bytes. The cell payload field includes user data or a payload. The cell header field is assigned with a header, such as a virtual path identifier (VPI) or a virtual channel identifier (VCI) for identifying a virtual path or a virtual channel to be delivered. That is, a combination of VPI/VCI serves as an identifier (the number) for identifying a virtual connection that is embedded in the ATM header field. By using the VPI/VCI in the ATM header field, it is possible to realize communication on the ATM cells between transmission terminals and reception terminals.

In addition, transmission ATM cells are converted by the ATM bridges into a reception LAN packet which is sent to the legacy LAN terminal. On the other hand, each of the LAN terminals transmits a transmission LAN packet to an ATM bridge which converts the transmission LAN packet into reception ATM cells received in the ATM terminal. Each of the LAN packets has a packet format which is defined, for example, by IEEE802.3/Ethernet or by IEEE802.5/Token-Ring. Accordingly, the ATM terminals receives the reception ATM cells having the cell header fields and the cell payload fields where the transmission LAN packet is segmented every forty-eight bytes. Each of the LAN packets has a packet header field for storing a LAN emulation client (LEC) ID of two bytes and a medium access control (MAC) address of six bytes. Accordingly, each of the LAN packets is segmented into the segmented parts whose first one is included in the cell payload field of a first ATM cell. In other words, the first ATM cell has the cell header field and the cell payload field for storing the LEC ID/MAC address.

On the ATM network with the LAN emulation function, there is various transmission LAN packets transmitted in accordance with unicast service, broadcast service, or multicast service with the transmission LAN packets encapsulated into reception ATM cells. In other words, the ATM terminal or an ATM communication control apparatus receives the various transmission LAN packets as the reception ATM cells or terminal reception packets. The transmission LAN packets or the terminal reception packets are classified into two groups which will herein be called a first and a second group. The first group of the transmission LAN packets is unnecessary ones to be received in the ATM terminal. The second group of the transmission LAN packets is necessary ones to be received in the ATM terminal. For example, the first group of the transmission LAN packets includes transmission LAN packets which the ATM terminal itself transmits or transmission LAN packets each having the LEC ID assigned to each channel of the ATM terminal. In addition, the first group of the transmission LAN packets further includes transmission LAN packets each having the MAC address for other destinations except the ATM terminal.

In the manner which will later be described in conjunction with FIG. 4, a conventional ATM terminal or a conventional ATM communication control apparatus comprises a physical layer device, a segmentation and reassembly (SAR) receiving section, a SAR transmitting section, a direct memory access (DMA) controller, a system bus, a central processing unit (CPU), and a system memory. Connected to the ATM network, the physical layer device has a function of an ATM physical layer. Connected to the physical layer device, the SAR receiving section receives the reception ATM cells supplied from the ATM network via the physical layer device. The SAR receiving section includes a reception first-in first-out (FIFO) memory for selectively storing the reception ATM cells as stored cells in the manner which will later be described. On the basis of a value of the identifier in the header field of each of the reception ATM cells, the SAR receiving section carries out decision of reception, verification for various errors, and reassembly of the terminal reception packets.

Connected to the physical layer device, the SAR transmitting section carries out cell segmentation of terminal transmission packets to be transmitted, rate control for the transmission ATM cells, and so on. The SAR transmitting section transmits the transmission ATM cells to the ATM network via the physical layer device. Connected to the SAR receiving section, to the SAR transmitting section, and to the system bus, the DMA controller carries out interface control between the SAR receiving section and the system bus and between the SAR transmitting section and the system bus. The CPU and the system memory are connected to the system bus.

Description will proceed to reception operation in the conventional ATM terminal. It will be assumed that the SAR receiving section in the ATM terminal is supplied from the ATM network via the physical layer device with the reception ATM cells. In this event, the SAR receiving section determines whether the cell payload field in each reception ATM cell should be received or discarded by identifying only a value of the VPI/VCI in the cell header field of the reception ATM cell without identifying contents of the cell payload field in which the LEC ID/MAC address of the transmission LAN packet is written.

When the SAR receiving section determines that the cell payload field of the reception ATM cell should be received on the basis of the value of the VPI/VCI, the cell payload field of the reception ATM cell where reception is allowed is written in the reception FIFO memory as a stored payload field. Thereafter, the DMA controller reads the stored payload field out of the reception FIFO memory as a read payload field. The DMA controller transfers the read payload field to the system memory via the system bus to write the read payload field in the system memory as a written payload field. The CPU identifies the LEC ID/MAC address of the written payload field in the system memory to finally determine whether the written payload field should be received or discarded.

As described above, in the conventional communication control apparatus, the CPU identifies the LEC ID/MAC address in the payload written in the system memory to carry out discard of the unnecessary reception packets. In addition, load takes to the system bus due to DMA transfer of the unnecessary reception packets. As a result, the conventional communication control apparatus is disadvantageous in that it degrades performance for reception processing.

In addition, the conventional communication control apparatus is disadvantageous in that it wastes vacant areas in the reception FIFO memory and in the system memory when it receives the ATM cells unnecessary to receive. More specifically, in a case where the reception FIFO memory is put into a full state by storing the ATM cells unnecessary to receive, the reception FIFO memory cannot store effective ATM cells which must receive rightfully.

Thus in summary, the SAR receiving section of the conventional communication apparatus carries out decision of reception by identifying only the value of the VPI/VCI in the cell header field of the reception ATM cell without identifying the LEC ID/MAC address for the transmission LAN packet that is included in the cell payload of the first ATM cell for the transmission LAN packet.

SUMMARY OF THE INVENTION

It is therefore an object of the present invention to provide a communication control apparatus which is capable of preventing degradation of reception processing in a central processing unit although it receives an LAN packet which is unnecessary to receive.

Other objects of this invention will become clear as the description proceeds.

According to an aspect of this invention, a method is for receiving a cell which has a header field for storing an identifier and a payload field for storing a payload. The method comprises the step of determining whether the cell should be received or be discarded on the basis not only of the identifier in the header field but also of a specific address in the payload included in the payload field to produce a determined result indicative of one of reception and discard for the cell, of storing the cell in a memory when the determined result indicates the reception for the cell, and of discarding the cell without storing it in the memory when the determined result indicates the discard for the cell.

According to another aspect of this invention, a method is for receiving cells into which a packet is segmented. Each of the cells has a header field for storing an identifier and a payload field for storing a payload. One of the cells is a first cell for the packet. The method comprises the step of determining whether the packet should be received or be discarded on the basis not only of the identifier in the header field but also of a specific address in the payload included in the payload field of the first cell to produce a determined result indicative of one of reception and discard for the packet, of storing the packet in a memory when the determined result indicates the reception for the packet, and of discarding the packet without storing it in the memory when the determined result indicates the discard for the packet.

According to still another aspect of this invention, a communication control apparatus receives reception cells and transmits transmission cells. Each of the reception cells and the transmission cells has a header field assigned with an identifier and a payload field assigned with a payload. The communication control apparatus comprises a physical layer device connected to a network. The physical layer device has a function of a physical layer in an asynchronous transfer mode (ATM). Connected to the physical layer device, a receiving section receives the reception cells supplied from the network via the physical layer device. The receiving section includes a memory for selectively storing the reception cells as stored cells. On the basis of a value of the identifier in the header field of each of the reception cells, the receiving section carries out decision of reception, verification for various errors, and reassembly of a reception packet. Connected to the physical layer device, a transmitting section carries out cell segmentation of a transmission packet to be transmitted and rate control for the transmission cells. The transmitting section transmits the transmission cells to the network via the physical layer device. Connected to the receiving section, the transmitting section, and a system bus, a direct memory access (DMA) controller interfaces the receiving section and the transmitting section with the system bus. The receiving section further comprises address filtering means connected to the physical layer device. The address filtering means identifies a value of a particular address in the payload included in the payload field of a first cell for the reception packet to produce an address filtered signal indicative of an identified value. Connected to the address filtering means and the memory, write-in control means determines whether or not the reception packet should be received on the basis of the identified value indicated by the address filtered signal. The write-in control means writes the reception packet in the memory when the reception packet should be received. The write-in control means discards the reception packet without writing it in the memory when the reception packet should be not received.

According to yet another aspect of this invention, a receiving unit receives reception cells each of which has a header field assigned with an identifier and a payload field assigned with a payload. The receiving unit includes a memory for selectively storing the reception cells as stored cells. On the basis of a value of the identifier in the header field of each of the reception cells, the receiving unit carries out decision of reception, verification for various errors, and reassembly of a reception packet. The receiving unit further comprises address filtering means for identifying a value of a particular address in the payload included in the payload field of a first cell for the reception packet to produce an address filtered signal indicative of an identified value. Connected to the address filtering means and the memory, write-in control means determines whether or not the reception packet should be received on the basis of the identified value indicated by the address filtered signal. The write-in control means writes the reception packet in the memory when the reception packet should be received. The write-in control means discards the reception packet without writing it in the memory when the reception packet should be not received.

BRIEF DESCRIPTION OF THE DRAWING

FIGS. 2A through 2C are views for use in describing formats of a LAN packet and an ATM cell;

DESCRIPTION OF THE PREFERRED EMBODIMENTS

Figure 1:
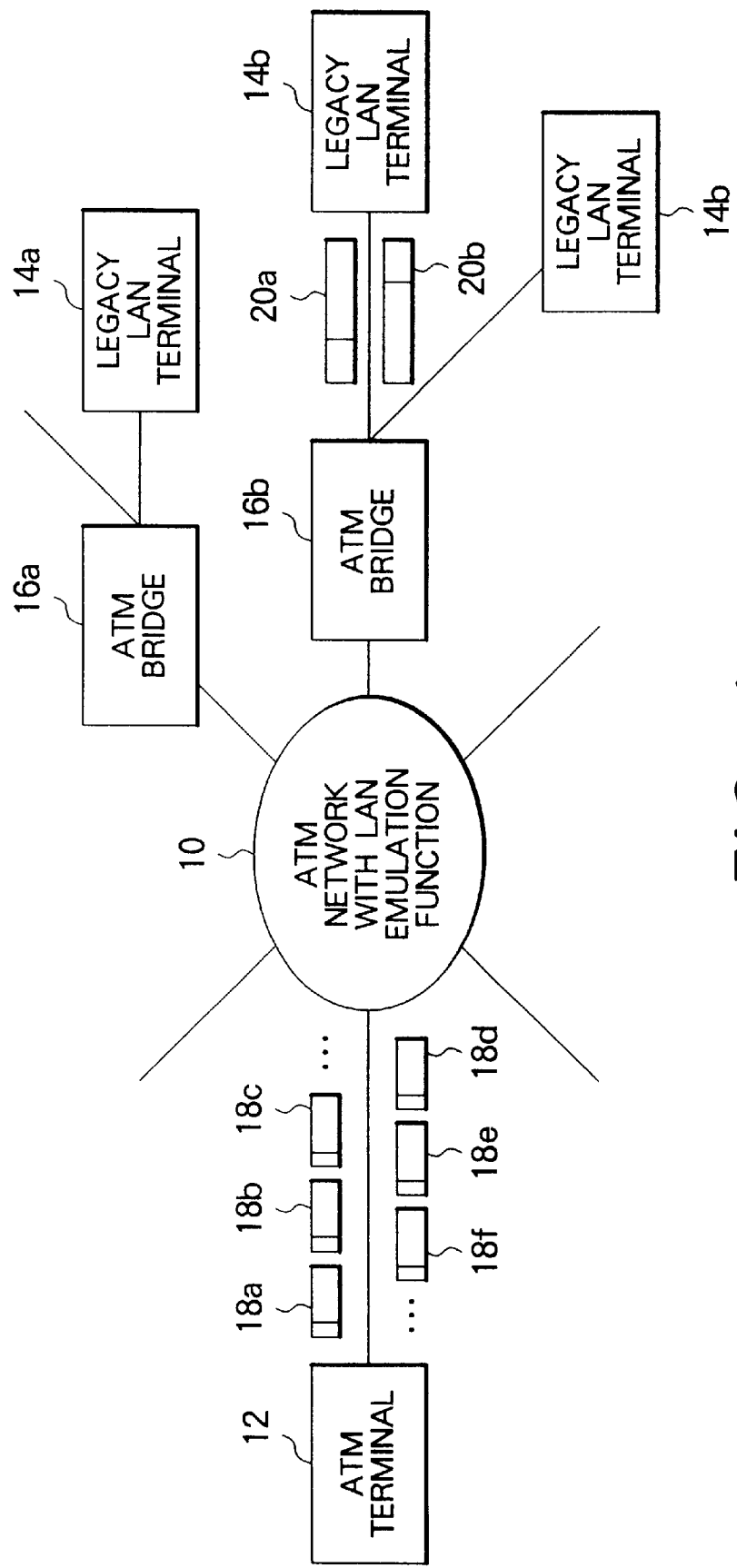
FIG. 1 is a block diagram of an asynchronous transfer mode (ATM) network system with a local area network (LAN) emulation to which this invention is applicable.

Referring to FIG. 1, an asynchronous transfer mode (ATM) network system with a local area network (LAN) emulation function will be described at first in order to facilitate an understanding of the present invention. The LAN emulation function is a function which artificially carries out legacy LAN communication on an ATM network. The LAN may, for example, be an Ethernet or a Token Ring.

The illustrated ATM network system with the LAN emulation function comprises the ATM network which is depicted at 10 and which has the LAN emulation function. The ATM network 10 with the LAN emulation function is connected to a plurality of ATM terminals (only one is illustrated in the figure) 12. In addition, the ATM network 10 with the LAN emulation function is connected to a plurality of legacy LAN terminals 14a, 14b, and 14c via a plurality of ATM bridges 16a and 16b. In this event, each ATM terminal 12 is generally provided with an ATM communication control apparatus for transmitting and receiving ATM cells in the manner which later become clear.

In the manner known in the art, it is to be noted that each of the ATM cells is composed of fifty-three bytes and has a cell header field of five bytes and a cell payload field of forty-eight bytes, as shown in FIG. 2C. The cell payload field includes user data or a payload. The cell header field is assigned with a header, such as a virtual path identifier (VPI) or a virtual channel identifier (VCI) for identifying a virtual path or a virtual channel to be delivered. That is, a combination of VPI/VCI serves as an identifier or the number for identifying a virtual connection that is embedded in the cell header field. By using the VPI/VCI in the cell header field, it is possible to realize communication on the ATM cells between transmission terminals and reception terminals. In addition, the cell header field is also assigned with a payload type indication (PTI) indicative of a payload type.

As shown in FIG. 1, the ATM terminal 12 receives reception ATM cells 18a, 18b, 18c, and so on from the ATM network 10 with the LAN emulation function and transmits transmission ATM cells 18d, 18e, 18f, and so on to the ATM network 10 with the LAN emulation function.

On the other hand, the legacy LAN terminal 14b transmits a transmission LAN packet 20a to the ATM bridge 16b and receives a reception LAN packet 20b from the ATM bridge 16b. The ATM bridge 16b converts the transmission LAN packet 20a into the reception ATM cells 18a, 18b, 18c, and so on in the manner which will later be described. In other words, the ATM bridge 16b encapsulates the transmission LAN packet 20a to produce the reception ATM cells. The reception ATM cells are transmitted to the ATM terminal 12 via the ATM network 10 with the emulation function. In addition, the ATM bridge 16b is supplied from the ATM terminal 12 with the transmission ATM cells 18d, 18e, 18f, and so on via the ATM network 10 with the emulation function. The ATM bridge 16b converts the transmission ATM cells into the reception LAN packet 20b which is supplied to the legacy LAN terminal 14b. In other words, the ATM bridge 16b packets or packages the transmission ATM cells to produce the reception LAN packet 20b.

Thus in summary, the legacy LAN terminal 14b transmits the transmission LAN packet 20a which are received in the ATM terminal 12 as a terminal reception packet comprising the reception ATM cells 18a, 18b, 18c, and so on. The ATM terminal 12 transmits a terminal transmission packet comprising the transmission ATM cells 18d, 18e, 18f, and so on that is received in the legacy LAN terminal 14b as the reception LAN packet 20b.

Herein, it is to be noted that each of the transmission LAN packet 20a and the reception LAN packet 20b has a packet header field and a packet payload field, as shown in FIG. 2A.

Figure 3A:
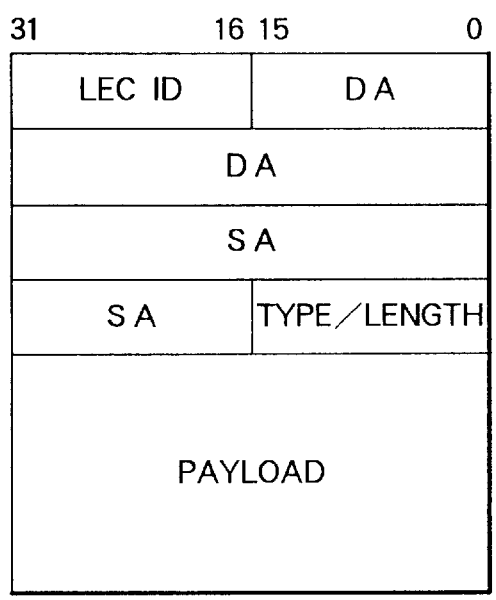
FIGS. 3A and 3B show frame formats of the LAN packets used in the ATM network system illustrated in FIG. 1.
Figure 3B:
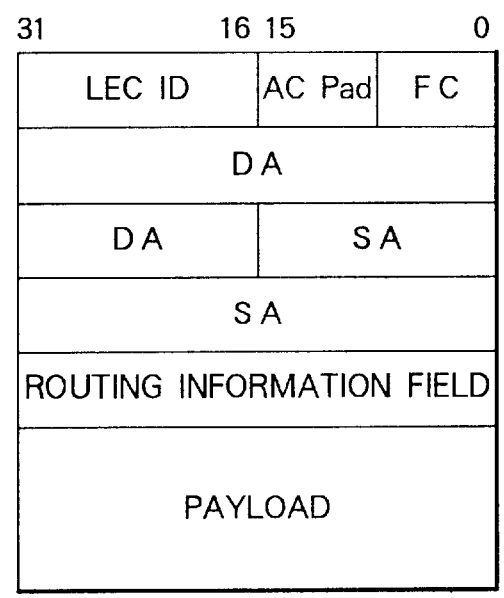

Referring to FIGS. 3A and 3B, each LAN packet has a packet format which is defined, for example, by IEEE802.3/Ethernet or by IEEE802.5/Token-Ring, as shown in FIGS. 3A and 3B, respectively.

As shown in FIG. 3A, the LAN packet defined by IEEE802.3/Ethernet has the LAN header field which consists of a LAN emulation client (LEC) ID field for storing a LEC ID of two bytes, a destination address (DA) field for storing a destination address of six bytes, a source address (SA) field for storing a source address of six byte, and a type/length field for storing type/length of two bytes.

As shown in FIG. 3B, the LAN packet defined by IEEE802.5/Token-Ring has the LAN header field which consists of a LEC ID field for storing a LEC ID of two bytes, an access control (AC) Pad field for storing an access control pad signal of one byte, a frame control (FC) field for storing a frame control signal of one byte, a destination address (DA) field for storing a destination address of six bytes, a source address (SA) field for storing a source address of six bytes, and a routing information field for storing routing information of four bytes.

The destination address is called a medium access control (MAC) address in the art. That is, any LAN packet has the LAN header field for storing at least the LEC ID of two bytes and the MAC address of six bytes, as shown in FIG. 2A.

Accordingly, the ATM bridge 16b segments the transmission LAN packet 20a into a plurality of segmented parts each of which is forty-eight bytes long and then adds header fields each having five bytes to the respective segmented parts to produce the reception ATM cells 18a, 18b, 18c, and so on, as shown in FIG. 2B. In other words, the ATM terminal 12 receives, as the terminal reception packet, the reception ATM cells having the header fields and the payload fields where the transmission LAN packet 20a is segmented every forty-eight bytes. The reception ATM cell 18a is called a first reception ATM cell for the transmission LAN packet 20a. The first reception ATM cell or the reception ATM cell 18a has the cell header field and the cell payload field including the LEC ID/MAC address, as shown in FIG. 2B.

On the ATM network 10 with the LAN emulation function, there is various transmission LAN packets transmitted in accordance with unicast service, broadcast service, or multicast service with the transmission LAN packets encapsulated into reception ATM cells. In other words, the ATM terminal 12 or an ATM communication control apparatus receives the various transmission LAN packets as the reception ATM cells or the terminal reception packets. The transmission LAN packets or the terminal reception packets are classified into two groups which will herein be called a first and a second group. The first group of the transmission LAN packets is unnecessary ones to be received in the ATM terminal 12. The second group of the transmission LAN packets is necessary ones to be received in the ATM terminal 12. For example, the first group of the transmission LAN packets includes transmission LAN packets which the ATM terminal 12 itself transmits or transmission LAN packets each having the LEC ID assigned to each channel of the ATM terminal 12. In addition, the first group of the transmission LAN packets further includes transmission LAN packets each having the MAC address for other destinations except the ATM terminal 12.

Figure 4:
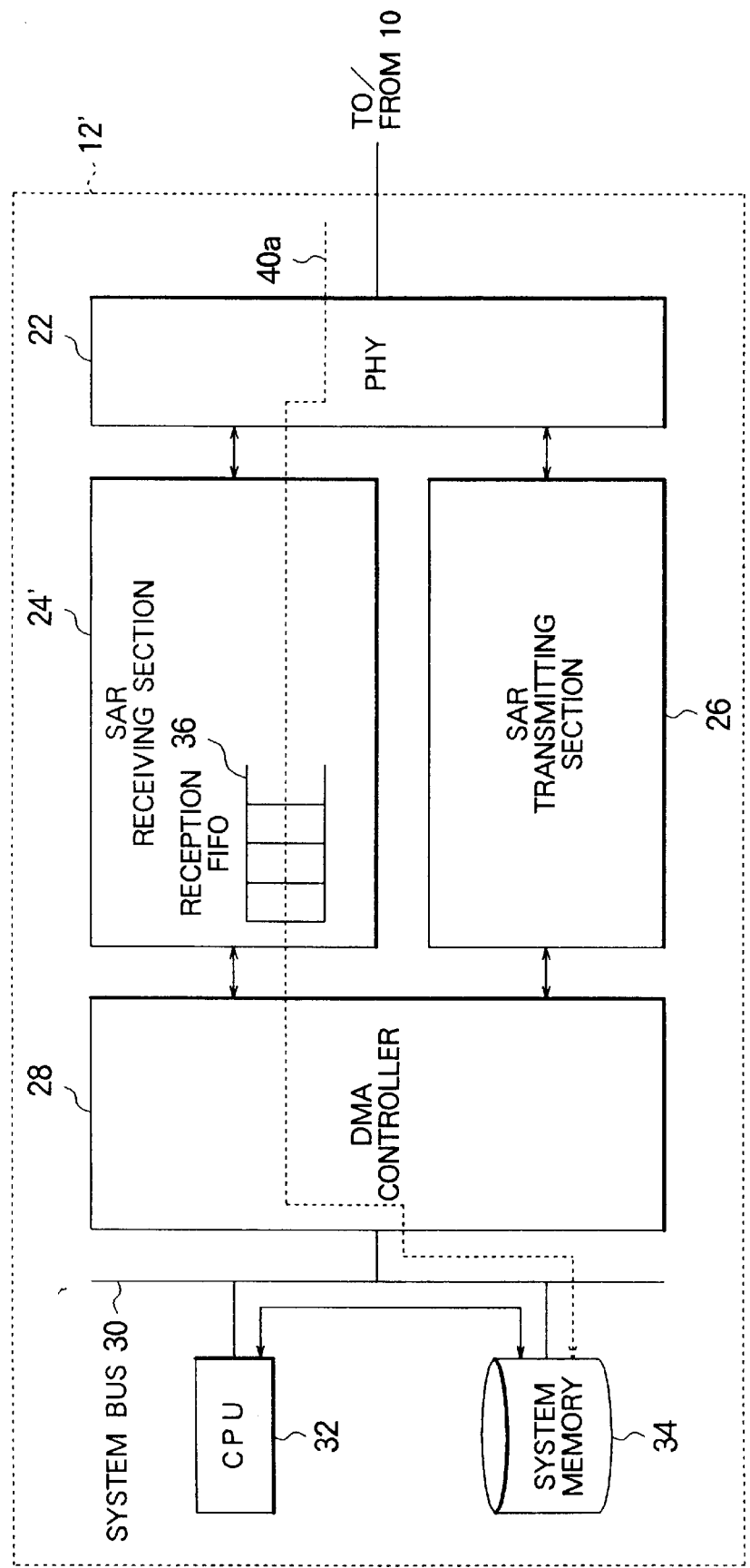
FIG. 4 is a block diagram of a conventional ATM terminal.

Referring to FIG. 4, a conventional ATM terminal or a conventional ATM communication control apparatus 12' will be described in order to facilitate an understanding of the present invention. The conventional ATM terminal 12' comprises a physical layer device (PHY) 22, a segmentation and reassembly (SAR) receiving section 24', a SAR transmitting section 26, a direct memory access (DMA) controller 28, a system bus 30, a central processing unit (CPU) 32, and a system memory 34.

The physical layer device 22 is connected to the ATM network 10 (FIG. 1) and has a function of an ATM physical layer. The SAR receiving section 24' is connected to the physical layer device 22. The SAR receiving section 24' is called a receiving unit.

The SAR receiving section 24' receives the reception ATM cells 18a, 18b, 18c, and or on (FIG. 1) supplied from the ATM network 10 via the physical layer device 22. The SAR receiving section 24' includes a reception first-in first-out (FIFO) memory 36 for selectively storing the reception ATM cells as stored cells in the manner which will later be described. On the basis of a value of the identifier in the header field of each of the reception ATM cells, the SAR receiving section 24' carries out decision of reception, verification for various errors, and reassembly of the terminal reception packets.

The SAR transmitting section 26 is connected to the physical layer device 22. The SAR transmitting section 26 carries out cell segmentation of terminal transmission packets to be transmitted, rate control for the transmission ATM cells, and so on. The SAR transmitting section 26 transmits the transmission ATM cells 18d, 18e, 18f, and so on to the ATM network 10 via the physical layer device 22.

The DMA controller 28 is connected to the SAR receiving section 241, the SAR transmitting section 26, and the system bus 30. The DMA controller 28 carries out interface control between the SAR receiving section 24' and the system bus 30 and between the SAR transmitting section 26 and the system bus 30. The CPU 32 and the system memory 34 are connected to the system bus 30.

Description will proceed to reception operation in the conventional ATM terminal 12' illustrated in FIG. 4. It will be assumed that the SAR receiving section 24' in the ATM terminal 12' is supplied from the ATM network 10 via the physical layer device 22 with the reception ATM cells 18a, 18b, 18c, and so on illustrated in FIG. 1. In this event, the SAR receiving section 24' determines whether the payload field in each reception ATM cell should be received or discarded by identifying only a value of the VPI/VCI in the cell header field of the reception ATM cell without identifying contents of the payload field in which the LEC ID/MAC address of the transmission LAN packet 20a (FIG. 2A) is written.

When the SAR receiving section 24' determines that the payload field of the reception ATM cell should be received on the basis of the value of the VPI/VCI, the payload field of the reception ATM cell where reception is allowed is written in the reception FIFO memory 36 as a stored payload field. Thereafter, the DMA controller 28 reads the stored payload field out of the reception FIFO memory 36 as a read payload field. The DMA controller 28 transfers the read payload field to the system memory 34 via the system bus 30 to write the read payload field in the system memory 34 as a written payload field. The CPU 32 identifies the LEC ID/MAC address of the written payload field in the system memory 34 to finally determine whether the written payload field should be received or discarded. In FIG. 4, a reference symbol of 40a depicts a data path for unnecessary reception ATM cells.

As described above, in the conventional communication control apparatus, the CPU 32 identifies the LEC ID/MAC address in the payload written in the system memory 34 to carry out discard of the unnecessary reception packets. In addition, load takes to the system bus 34 due to DMA transfer of the unnecessary reception packets. As a result, the conventional communication control apparatus is disadvantageous in that it degrades performance for reception processing, as mentioned in the preamble of the instant specification.

In addition, the conventional communication control apparatus is disadvantageous in that it wastes vacant areas in the reception FIFO memory 36 and in the system memory 34 when it receives the ATM cells unnecessary to receive. More specifically, in a case where the reception FIFO memory 36 is put into a full state by storing the ATM cells unnecessary to receive, the reception FIFO memory 36 cannot store effective ATM cells which must receive rightfully, as mentioned also in the preamble in the instant specification.

Figure 5:
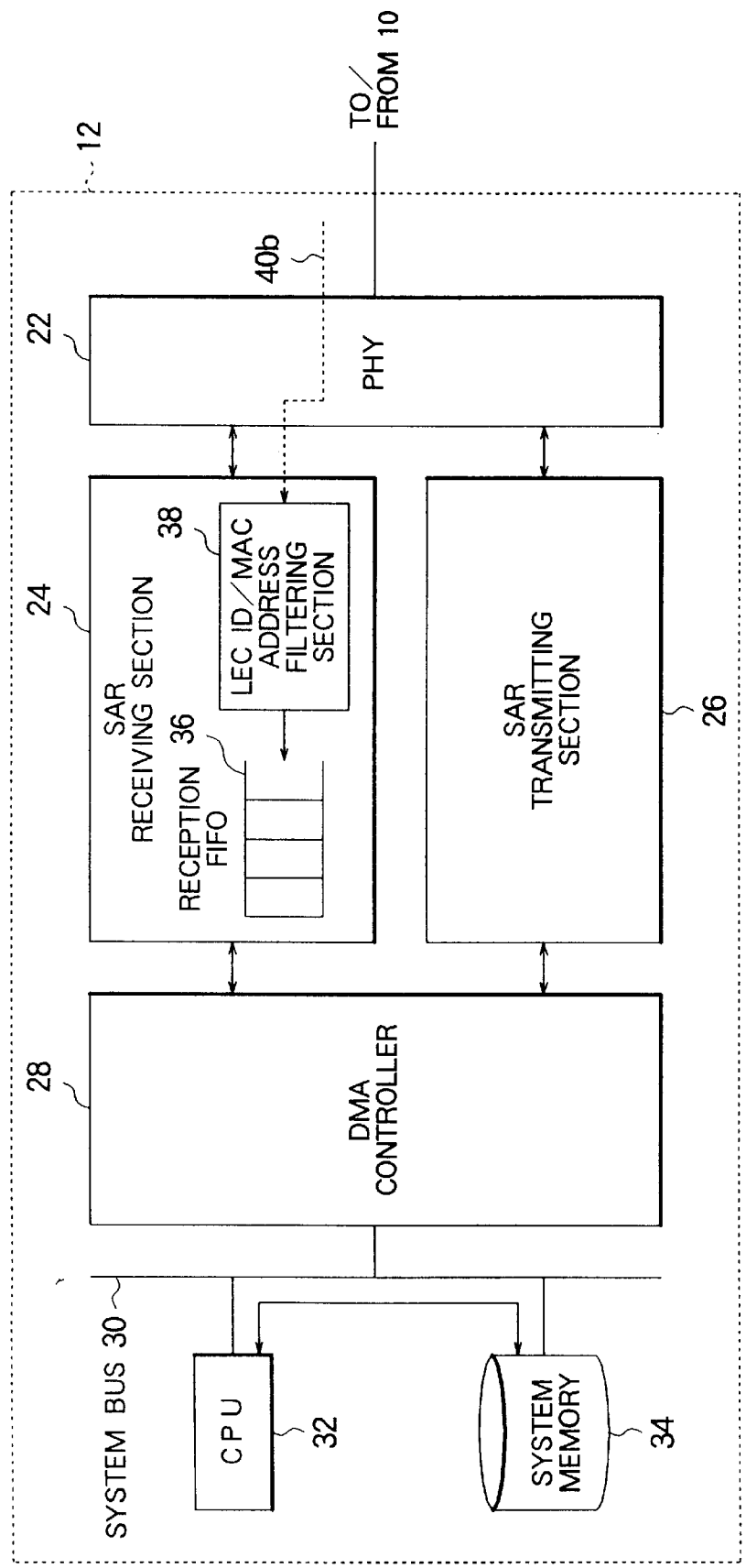
FIG. 5 is a block diagram of an ATM terminal according to an embodiment of the present invention.

Referring to FIG. 5, the description will proceed to an ATM terminal or a communication control apparatus 12 according to a preferred embodiment of this invention. The illustrated ATM terminal 12 is similar in structure and operation to the conventional ATM terminal 12' illustrated in FIG. 4 except that the SAR receiving section is modified from that illustrated in FIG. 4 in the manner which will become clear as the description proceeds. The SAR receiving section is therefore depicted at 24. The same symbols are appended to the similar components illustrated in FIG. 4 and the description therefore is omitted due to simplification of the description.

The SAR receiving section 24 includes not only the reception FIFO memory 36 for selectively storing the reception ATM cells but also an LEC ID/MAC address filtering section 38 for carrying out determination of reception on the basis of the LEC ID of two bytes and the MAC address for destination of six bytes in the transmission LAN packet 20a or the terminal reception packet.

Description will proceed to reception operation in the ATM terminal 12 illustrated in FIG. 5. It will be assumed that the SAR receiving section 24 in the ATM terminal 12 is supplied from the ATM network 10 via the physical layer device 22 with the reception ATM cells 18a, 18b, 18c, and so on as illustrated in FIG. 1. In this event, the SAR receiving section 24 determines whether the payload field in each reception ATM cell should be received or discarded by identifying a value of the VPI/VCI in the ATM header field of the reception ATM cell.

In addition, the LEC ID/MAC address filtering section 38 identifies a value of LEC ID/MAC address included in the payload of the reception ATM cell to discard the first group of the transmission LAN packets. In FIG. 5, a reference symbol of 40b depicts a data path for unnecessary reception ATM cells.

When the SAR receiving section 24 determines that the payload field of the reception ATM cell should be received on the basis not only of the value of the VPI/VCI but also of the value of the LEC ID/MAC address, the payload field of the reception ATM cell where reception is allowed is written in the reception FIFO memory 36 as a stored payload field. Thereafter, the DMA controller 28 reads the stored payload field out of the reception FIFO memory 36 as a read payload field. The DMA controller 28 transfers the read payload field to the system memory 34 via the system bus 30 to write the read payload field in the system memory 34 as a written payload field.

Accordingly, inasmuch as the LEC ID/MAC address filtering section 38 in the SAR receiving section 24 identifies the LEC ID/MAC address included in each first ATM cell for the transmission LAN packet to discard the first group of the transmission LAN packets so as to do not store those in the reception FIFO memory 36, it is possible to prevent vacant areas in the reception FIFO memory 36 and in the system memory 34 from wasting and to decrease leaving out of the payloads of the reception ATM cells which should rightfully be written in the reception FIFO memory 36.

In addition, inasmuch as the CPU 32 may not identify the LEC ID/MAC address in the payload written in the system memory 34, it is possible to lighten a load for the CPU 32 and the system bus 30 in comparison with prior art.

Figure 6:
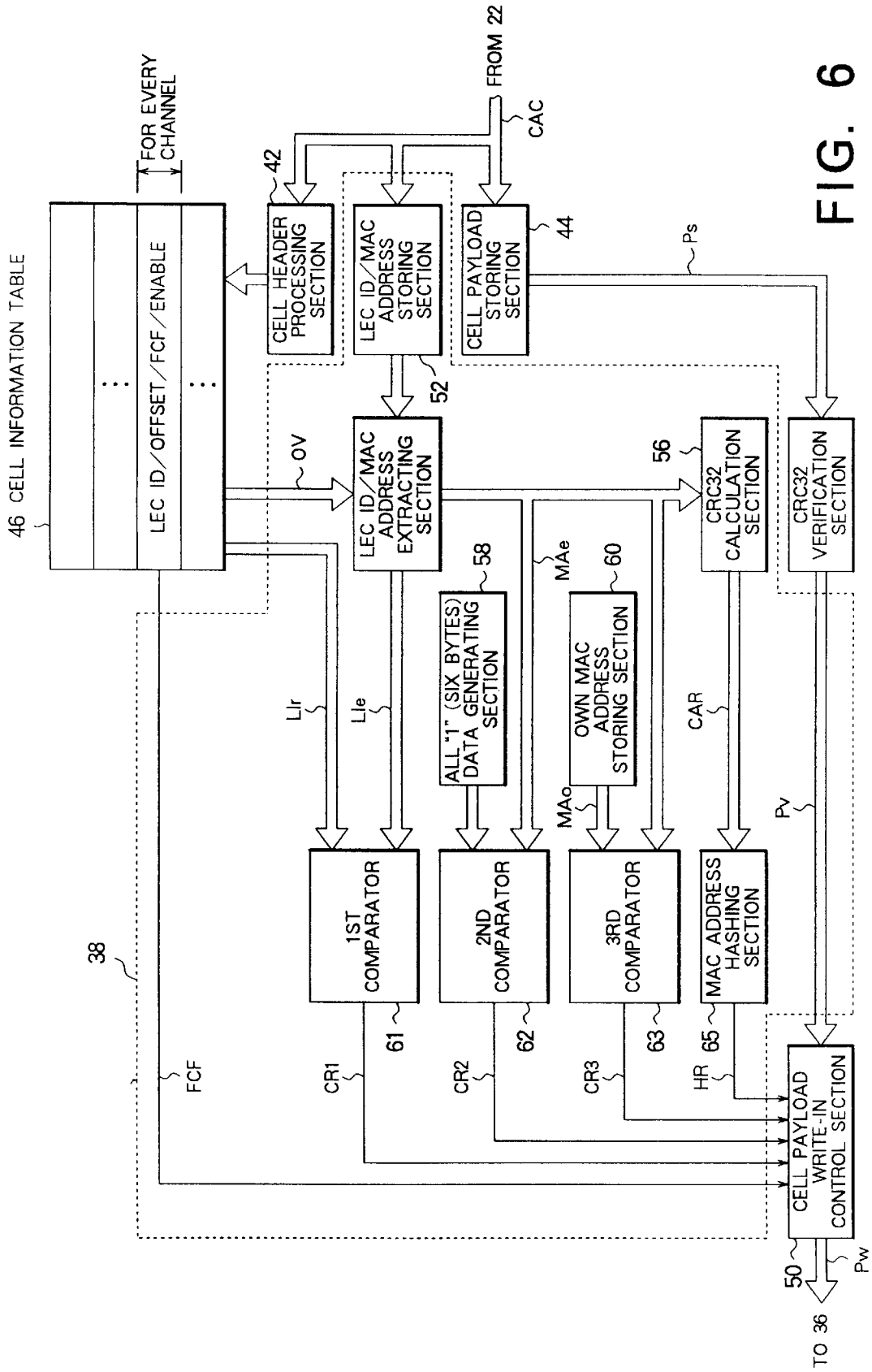
FIG. 6 is a block diagram of an LEC ID/MAC address filtering section in a segmentation and reassembly (SAR) receiving section for use in the ATM terminal illustrated in FIG. 6.

Referring to FIG. 6, the description will proceed to the LEC ID/MAC address filtering section 38 and peripheral portions thereof in the ATM terminal 12 illustrated in FIG. 5. The SAR receiving section 24 comprises, as the peripheral portions of the LEC ID/MAC address filtering section 38, a cell header processing section 42, a cell payload storing section 44, a cell information table 46, a cyclic redundancy check (CRC) 32 verification section 48, and a cell payload write-in control section 50.

The cell header processing section 42 is connected to the physical layer device 22 (FIG. 1). The cell header processing section 42 processes the ATM header field of a current reception ATM cell CAC to supply the cell information table 46 with a processed result indicative of a channel. The cell information table 46 preliminarily stores cell information every channel. The cell information includes an offset value for the MAC address, information indicative of the first ATM cell, a filtering continuation flag FCF, first and second enable flags, and so on. The filtering continuation flag FCF indicates that whether or not the filtering should be continued. The first enable flag indicates that whether or not an LEC ID filtering should be carried out. The second enable flag indicates that whether or not an MAC address filtering should be carried out.

The cell payload storing section 44 is connected to the physical layer device 22 (FIG. 5) The cell payload storing section 44 stores the payload of the current reception ATM cell CAC as a stored payload Ps.

The CRC 32 verification section 48 is connected to the cell payload storing section 44. The CRC 32 verification section 48 carries out verification for CRC 32 on the stored payload Ps stored in the cell payload storing section 44 to produce a verified payload Pv. The cell payload write-in control section 50 is connected to the CRC 32 verification section 48, the LEC ID/MAC address filtering section 38, and to the reception FIFO memory 36 (FIG. 5). In the manner which will later become clear, the cell payload write-in control section 50 carries out write-in control on the verified payload Pv on the basis of data supplied from the LEC ID/MAC address filtering section 38 to write a desired payload in the reception FIFO memory 36 as a write-in payload Pw.

The LEC ID/MAC address filtering section 38 comprises an LEC ID/MAC address storing section 52, an LEC ID/MAC address extracting section 54, a CRC 32 calculation section 56, an all "1" data generating section 58 for generating all "1" data having six bytes, an own MAC address storing section 60 for storing its own MAC address assigned to the ATM terminal 12, first through third comparators 61, 62, and 63, and an MAC address hashing section 65.

The LEC ID/MAC address storing section 52 is connected to the physical layer device 22. The LEC ID/MAC address storing section 52 stores data for an area including the LEC ID/MAC address in the payload of the current reception ATM cell CAC in order to take out the LEC ID/MAC address of the transmission LAN packet (the terminal reception packet) from the payload of the current reception ATM cell CAC. The LEC ID/MAC address storing section 52 may be composed of a random access memory (RAM) or a group of flip-flops.

The LEC ID/MAC address extracting section 54 is connected to the LEC ID/MAC address storing section 52 and the cell information table 46. Responsive to the data stored in the cell information table 46, the LEC ID/MAC address extracting section 54 extracts the LEC ID/MAC address from the data read from the LEC ID/MAC address storing section 52 to produce an extracted LEC ID LIe and an extracted MAC address MAe.

The first comparator 61 is connected to the cell information table 46 and the LEC ID/MAC address extracting section 54. The first comparator 61 compares the extracted LEC ID with an LEC ID in the cell information table 46 to determine whether or not writing of payload of the current reception ATM cell CAC to the reception FIFO memory 36 should be carried out. That is, the first comparator 61 serves in cooperation with the cell information table 46 as an LEC ID filtering section for carrying out an LEC ID filtering on the LEC ID. The first comparator 61 produces a first compared result CR1 or a LEC ID filtered signal which is supplied to the cell payload write-in control section 50.

The all "1" data generating section 58 generates all "1" data having six bytes that is supplied to the second comparator 62. The second comparator 62 is connected to the LEC ID/MAC address extracting section 54. The second comparator 62 compares the all "1" data with the extracted MAC address MAe. That is, a combination of the second comparator 62 and the all "1" data generating section 58 acts as a first MAC address filtering section for carrying out a broadcast filtering on the extracted MAC address MAe for a broadcast. The second comparator 62 produces a second compared result CR2 or a first MAC address filtered signal which is supplied to the cell payload write-in control section 50.

The own MAC address storing section 60 registers or stores the own MAC address MAo which is supplied to the third comparator 63. The third comparator 63 is conneted to the LEC ID/MAC address extracting section 54. The third comparator 63 compares the own MAC address MAo with the extracted MAC address MAe. That is, a combination of the third comparator 63 and the own MAC address storing section 60 is operable as a second MAC address filtering section for carrying out a uicast filtering on the extracted MAC address MAe for a unicast. The third comparator 63 produces a third compared result CR3 or a second MAC address filtered signal which is supplied to the cell payload write-in control section 50.

The CRC 32 calculation section 56 is connected to the LEC ID/MAC address extracting section 54. The CRC 32 calculation section 56 calculates an error correcting code of the extracted MAC address MAe to produce a calculated result CAR indicative of the error correcting code. The MAC address hashing section 65 is connected to the CRC 32 calculation section 56. The MAC address hashing section 65 hashes the calculated result CAR. In other words, a combination of the MAC address hashing section 65 and the CRC 32 calculation section 56 serves as a third MAC address filtering section for carrying out a multicast filtering on the extracted MAC address MAe for a multicast. The MAC address hashing section 65 produces a hashed result HR or a third MAC address filtered signal which is supplied to the cell payload write-in control section 50.

At any rate, a combination of the all "1" data generating section 58, the second comparator 62, the own MAC address storing section 60, the third comparator 63, the CEC 32 calculation section 56, and the MAC address hashing section 65 is operable as an MAC address filtering section for carrying out filtering on the MAC address.

Figure 7:
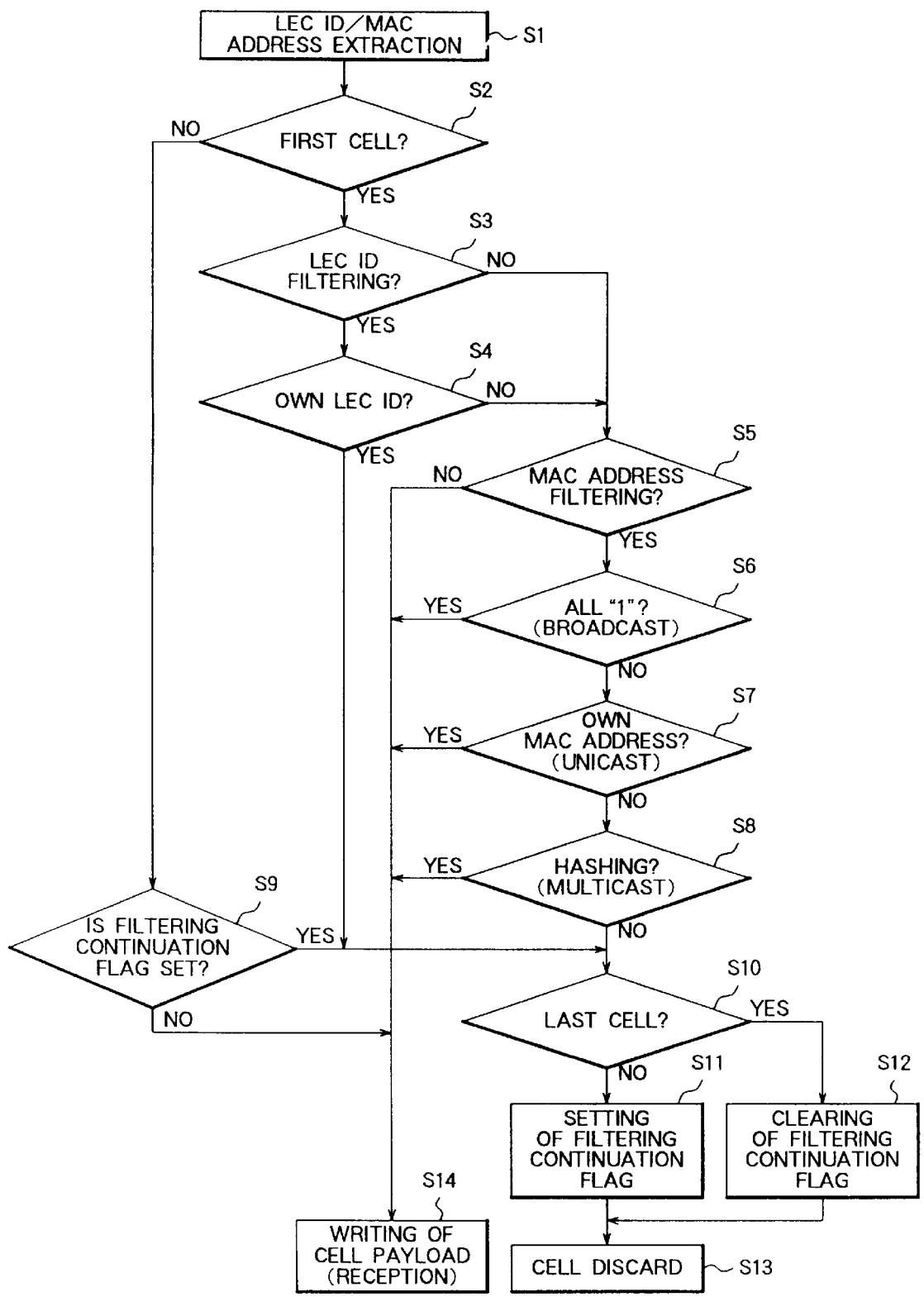
FIG. 7 shows a flow chart for use in describing operation of the LEC ID/MAC address filtering section illustrated in FIG. 6.

Referring to FIG. 7 in addition to FIG. 6, description will be made as regards operation of the LEC ID/MAC address filtering section 38. At first, the LEC ID/MAC address extracting section 54 extracts the LEC ID and the MAC address from the data including the LEC ID/MAC address that is read out of the LEC ID/MAC address storing section 52 at a step S1. The LEC ID is located in the head two bytes of the payload in the first reception ATM cell 18a for the transmission LAN packet 20a. Inasmuch as the MAC address for destination having six bytes is different in position from in accordance with type of the LAN as shown in FIGS. 3A and 3B, the LEC ID/MAC address extracting section 54 reads the offset value OV for the MAC address out of the cell information table 46 to recognize the position of the MAC address and to extract the MAC address. The offset value OV is variable between zero and eight bytes counted from the position of the LEC ID.

The step S1 is followed by a step S2 at which the LEC ID/MAC address filtering section 38 determines whether or not the current reception ATM cell CAC is the first ATM cell 18a (FIG. 2B) for the transmission LAN packet 20a (FIG. 2A) in accordance with data read out of the cell information table 46. When the current reception ATM cell CAC is not the first ATM cell 18a, the step S2 proceeds to a step S9 at which the cell payload write-in control section 50 reads the filtering continuation flag FCF out of the cell information table 46 to determine whether or not the filtering continuation flag FCF is set. When the filtering continuation flag FCF is not set, the step S9 is succeeded by a step S14.

At the step S14, the CRC 32 verification section 48 reads the stored payload Ps out of the cell payload storing section 44 to carry out verification on the stored payload Ps using a cyclic redundancy check (CRC) code of 32 bits that is an error correcting code (ECC). In addition, the CRC 32 verification section 48 produces the verified payload Pv which is supplied to the cell payload write-in control section 50. Supplied with the verified payload Pv, the cell payload write-in control section 50 writes the verified payload Pv in the reception FIFO memory 36 (FIG. 5) as the write-in payload Pw.

When the current reception ATM cell CAC is the first ATM cell 18a, the step S2 is followed by a step S3 at which the LEC ID/MAC address filtering section 38 reads the first enable flag out of the cell information table 46 to determine whether or not the LEC ID filtering should be carried out. When the LEC ID/MAC address filtering section 38 determines that the LEC ID filtering should be carried out, the step S3 proceeds to a step S4 at which the LEC ID filtering is carried out. That is, the first comparator 61 carries out the LEC ID filtering by comparing the registered LEC ID LIr of the channel in the current reception ATM cell CAC that is registered in the cell information table 46 with the extracted LEC ID LIe which is extracted from the payload of the current reception ATM cell CAC. In other words, the first comparator 61 determines whether or not the extracted LEC ID LIe coincides with its own LEC ID for the ATM terminal 12.

When the first comparator 61 determines that the extracted LEC ID LIe coincides with the own LEC ID, the step S4 is succeeded by a step S10 at which the LEC ID/MAC address filtering section 38 determines whether or not the current reception ATM cell CAC is the last ATM cell for the transmission LAN packet 20a.

When the first comparator 61 determines that the extracted LEC ID LIe does not coincide with the own LEC ID, the step S4 is followed by a step S5 at which the LEC ID/MAC address filtering section 38 determines whether or not the MAC address filtering should be carried out on the basis of the second enable flag read out of the cell information table 46. When the LEC ID/MAC address filtering section 38 determines that the MAC address filtering should be carried out, the step S5 proceeds to steps S6, S7, and S8 at which the MAC address filtering is carried out three stages of the broadcast filtering, of the unicast filtering, and of the multicast filtering.

AT the step S6, the second comparator 62 carries out the broadcast filtering by comparing the all "1" data generated by the all "1" data generating section 58 with the extracted MAC address MAe which is extracted from the payload of the current reception ATM cell CAC by the LEC ID/MAC address extracting section 54. When the second compared result CR2 of the second comparator 62 or the first MAC address filtered signal indicates that the extracted MAC address MAe coincides with the all "1" data, the step S6 is succeeded by the step S14 at which the cell payload write-in control section 50 writes the verified payload Pv for the current reception ATM cell CAC in the reception FIFO memory 36 as the write-in payload Pw. When the extracted MAC address MAe does not coincide with the all "1" data, the step S6 is followed by the step S7 at which the unicast filtering is carried out in the manner which will presently be described.

At the step S7, the third comparator 63 carries out the unicast filtering by comparing the own MAC address MAo read out of the own MAC address storing section 60 with the extracted MAC address MAe which is extracted from the payload of the current reception ATM cell CAC by the LEC ID/MAC address extracting section 54. When the third compared result CR3 of the third comparator 63 or the second MAC address filtered signal indicates that the extracted MAC address MAe coincides with the own MAC address MAo, the step S7 is followed by the step S14 at which the cell payload write-in control section 50 writes the verified payload Pv for the current reception ATM cell CAC in the reception FIFO memory 36 as the write-in payload Pw. When the extracted MAC address MAe does not coincide with the own MAC address MAo, the step S7 proceeds to the step S8 at which the multicast filtering is carried out in the manner which will presently be described.

At the step S8, the multicast filtering is carried out in accordance with a hashing algorithm. In the hashing algorithm, the CRC 32 calculation section 56 calculates on the extracted MAC address MAe to produce the calculated result CAR having thirty-two bits. Upper six bits of the calculated result CAR are supplied to the MAC address hashing section 65 as a pointer. Responsive to the pointer, the MAC address hashing section 65 searches an array of sixty-four bits to be filtered. When the MAC address hashing section 65 produces the hashed result HR or the third MAC address filtered signal indicating that a hash hits, the step S8 is succeeded by the step S14 at which the cell payload write-in control section 50 writes the verified payload Pv for the current reception ATM cell CAC in the reception FIFO memory 36 as the write-in payload Pw. When the hashed result HR or the third MAC address filtered signal indicates that the hash does not hit, the write-in payload Pw is discarded in the manner which will become clear as the description proceeds.

As described above, if any one condition is satisfied in determination of the MAC address filtering at the above-mentioned steps S6 to S8, the cell payload write-in control section 50 writes the write-in payload Pw for the current reception ATM cell CAC in the reception FIFO memory 36. In addition, order of the broadcast filtering, the unicast filtering, and the multicast filtering is not always fixed and all of the broadcast filtering, the unicast filtering, and the multicast filtering may be carried out simultaneously. Furthermore, when both of the LEC ID filtering and the MAC address filtering are not carried out (NO in the steps S3 and S5), the cell payload write-in control section 50 writes the write-in payload Pw for the current reception ATM cell CAC in the reception FIFO memory 36 at the step S14.

If a discard condition for the current reception ATM cell CAC is satisfied at any one of the steps S4, S8, and S9, the LEC ID/MAC address filtering section 38 determines whether or not the current reception ATM cell CAC is the last ATM cell for the transmission LAN packet 20a at the step S10. Determination of the last ATM cell is identified on the basis of a value of the payload type indication (PTI) in the cell header field of the current reception ATM cell CAC. When the current reception ATM cell CAC is not the last ATM cell for the transmission LAN packet 20a, the step S10 is followed by a step S11 at which the LEC ID/MAC address filtering section 38 sets the filtering continuation flag FCF. The step S11 proceeds to a step S13 at which the current reception ATM cell CAC is discarded. This is because the LEC ID/MAC address filtering section 38 discards all of the reception ATM cells belonging to the transmission LAN packet received after this. When the current reception ATM cell CAC is the last ATM cell for the transmission LAN packet 20a, the step S10 is succeeded by a step S12 at which the LEC ID/MAC address filtering section 38 clears the filtering continuation flag FCF. The step S12 is followed by the step S13 at which the current reception ATM cell CAC is discarded.

Figure 8:
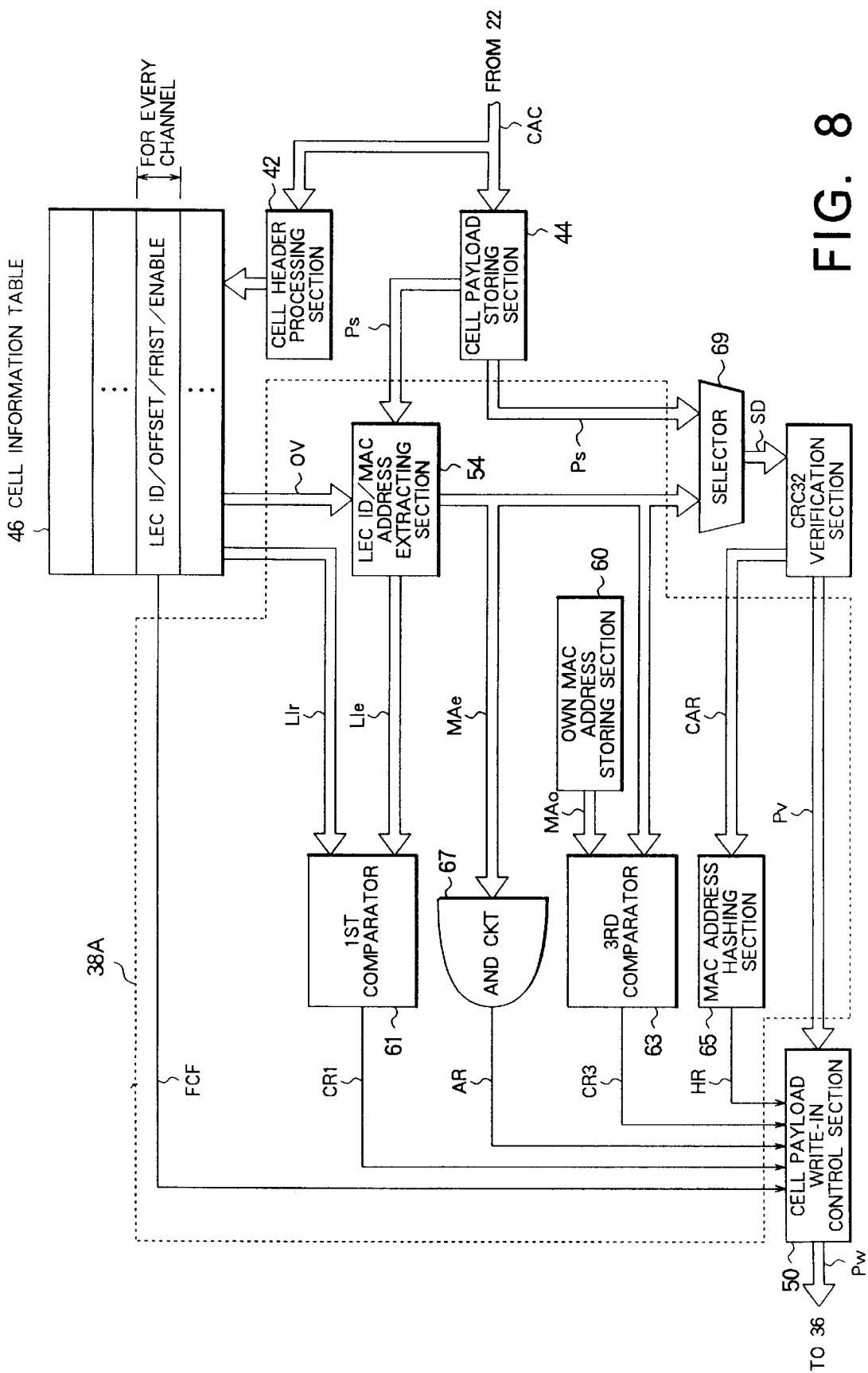
FIG. 8 is a block diagram of another LEC ID/MAC address filtering section in the SAR receiving section for use in the ATM terminal illustrated in FIG. 6.

Referring to FIG. 8, the description will proceed to another LEC ID/MAC address filtering section 38A and peripheral portions thereof in the ATM terminal 12 illustrated in FIG. 5. The LEC ID/MAC address filtering section 38A is similar in structure and operation to the LEC ID/MAC address filtering section 38 illustrated in FIG. 6 except that the LEC ID/MAC address storing section 52 and the CRC 32 calculation section 56 are omitted from the LEC ID/MAC address filtering section 38 and the LEC ID/MAC address filtering section 38A comprises an AND circuit 57 in lieu of a combination of the all "1" data generating section 58 and the second comparator 62. The same symbols are appended to the similar components illustrated in FIG. 6 and the description therefore is omitted due to simplification of the description.

In addition, the illustrated SAR receiving section further comprises, as one of the peripheral portions of the LEC ID/MAC address filtering section 38A, a selector 69.

The selector 69 is connected to the cell payload storing section 44, the LED ID/MAC address extracting section 54, and the CRC 32 verification section 48. That is, the selector 69 is supplied with the stored payload Ps and the extracted MAC address MAe from the cell payload storing section 44 and the LEC ID/MAC address extracting section 54, respectively. The selector 69 selects one of the stored payload Ps and the extracted MAC address MAe as selected data SD which is supplied to the CRC 32 verification section 48 in a time series fashion. Accordingly, the CRC 32 verification section 48 carries out not only verification for CRC 32 on the stored payload Ps stored in the cell payload storing section 44 but also calculation of the error correcting code of the extracted MAC address MAe.

In the LEC ID/MAC address filtering section 38A, the LEC ID/MAC address extracting section 54 is directly connected to the cell payload storing section 44 in place of the LEC ID/MAC address storing section 52 (FIG. 6). The LEC ID/MAC address extracting section 54 extracts the LEC ID/MAC address from the stored payload Ps read from the cell payload storing section 44 to produce the extracted LEC ID LIe and the extracted MAC address MAe.

In addition, the AND circuit 67 carries out the broadcast filtering by ANDing the extracted MAC address MAe bit by bit. The AND circuit 67 produces an ANDed result AR as the first MAC address filtered signal. When the extracted MAC address MAe coincides with the all "1" data, the AND circuit 67 produces the ANDed result AR having a logic high level. Responsive to the ANDed result AR having the logic high level, the cell payload write-in control section 50 writes the write-in payload Pw for the current reception ATM cell CAC in the reception FIFO memory 36.

With this structure, the LEC ID/MAC address filtering section 38A carries out the similar operation in accordance with a flowchart illustrated in FIG. 7. In addition, the LEC ID/MAC address filtering section 38A is advantageous in that it is simple in structure in comparison with the LEC ID/MAC address filtering section 38 illustrated in FIG. 6.

While this invention has thus far been described in conjunction with preferred embodiments thereof, it will now be readily possible for those skilled in the art to put this invention into various other manners.

What is claimed is:

1. A communication control apparatus for receiving reception cells and for transmitting transmission cells, each of the reception cells and the transmission cells having a header field assigned with an identifier and a payload field assigned with a payload, said communication control apparatus comprising:

a physical layer device, connected to a network, having a function of a physical layer in an asynchronous transfer mode (ATM);

a receiving section, connected to said physical layer device, for receiving said reception cells supplied from said network via said physical layer device, said receiving section including a memory for selectively storing the reception cells as stored cells, said receiving section carrying out, on the basis of a value of the identifier in the header field of each of the reception cells, decision of reception, verification for various errors, and reassembly of a reception packet constituted by a plurality of reception cells;

a transmitting section, connected to said physical layer device, for carrying out cell segmentation of a transmission packet constituted by a plurality of transmission cells to be transmitted and rate control for the transmission cells, said transmitting section transmitting the transmission cells to said network via said physical layer device; and a direct memory access (DMA) controller, connected to said receiving section, said transmitting section, and a system bus, for interfacing said receiving section and said transmitting section with said system bus, said receiving section further comprising:

address filtering means, connected to said physical layer device, for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; wherein:

the particular address consisting of a LAN emulation client (LEC) ID and a medium access control (MAC) address, said receiving section including a cell information table for storing cell information every channel, wherein said address filtering means comprises:

an address storing section, connected to said physical layer device, for storing data including the particular address in the payload of the payload field as stored data;

an address extracting section, connected to said address storing section, for extracting the LEC ID and the MAC address from the stored data to produce an extracted LEC ID and an extracted MAC address;

LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and MAC address filtering means, connected to said address extracting section, for carrying out an MAC address filtering on the basis of the extracted MAC address;

wherein said MAC address filtering means comprises:

a first MAC address filtering section for carrying out a broadcast filtering on the extracted MAC address for a broadcast to produce a first MAC address filtered signal;

a second MAC address filtering section for carrying out a unicast filtering on the extracted MAC address for a unicast to produce a second MAC address filtered signal; and a third MAC address filtering section for carrying out a multicast filtering on the extracted MAC address for a multicast to produce a third MAC address filtered signal; and wherein said first MAC address filtering section comprises an AND circuit, connected to said address extracting section, for ANDing the extracted MAC address bit by bit to produce an ANDed result as the first MAC address filtered signal.

2. A communication control apparatus as claimed in claim 1, wherein said write-in control means writes the reception packet in said memory when the ANDed result has a logic high level.

3. A communication control apparatus for receiving reception cells and for transmitting transmission cells, each of the reception cells and the transmission cells having a header field assigned with an identifier and a payload field assigned with a payload, said communication control apparatus comprising:

a physical layer device, connected to a network, having a function of a physical layer in an asynchronous transfer mode (ATM);

a receiving section, connected to said physical layer device, for receiving said reception cells supplied from said network via said physical layer device, said receiving section including a memory for selectively storing the reception cells as stored cells, said receiving section carrying out, on the basis of a value of the identifier in the header field of each of the reception cells, decision of reception, verification for various errors, and reassembly of a reception packet constituted by a plurality of reception cells;

a transmitting section, connected to said physical layer device, for carrying out cell segmentation of a transmission packet constituted by a plurality of transmission cells to be transmitted and rate control for the transmission cells, said transmitting section transmitting the transmission cells to said network via said physical layer device; and a direct memory access (DMA) controller, connected to said receiving section, said transmitting section, and a system bus, for interfacing said receiving section and said transmitting section with said system bus, said receiving section further comprising:

address filtering means, connected to said physical layer device, for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; wherein:

the particular address consisting of a LAN emulation client (LEC) ID and a medium access control (MAC) address, said receiving section including a cell information table for storing cell information every channel, wherein said address filtering means comprises:

an address storing section, connected to said physical layer device, for storing data including the particular address in the payload of the payload field as stored data;

an address extracting section, connected to said address storing section, for extracting the LEC ID and the MAC address from the stored data to produce an extracted LEC ID and an extracted MAC address;

LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and MAC address filtering means, connected to said address extracting section, for carrying out an MAC address filtering on the basis of the extracted MAC address;

wherein said MAC address filtering means comprises:

a first MAC address filtering section for carrying out a broadcast filtering on the extracted MAC address for a broadcast to produce a first MAC address filtered signal;

a second MAC address filtering section for carrying out a unicast filtering on the extracted MAC address for a unicast to produce a second MAC address filtered signal; and a third MAC address filtering section for carrying out a multicast filtering on the extracted MAC address for a multicast to produce a third MAC address filtered signal; and wherein said third MAC address filtering section comprises:

a calculation section, connected to said address extracting section, for calculating an error correcting code of the extracted MAC address to produce a calculated result indicative of the error correcting code; and an MAC address hashing section, connected to said calculation section, for hashing the calculated result to produce a hashed result as the third MAC address filtered signal.

4. A communication control apparatus as claimed in claim 3, wherein said write-in control means writes the reception packet in said memory when the hashed result indicates that a hash hits.

5. A communication control apparatus for receiving reception cells and for transmitting transmission cells, each of the reception cells and the transmission cells having a header field assigned with an identifier and a payload field assigned with a payload, said communication control apparatus comprising:

a physical layer device, connected to a network, having a function of a physical layer in an asynchronous transfer mode (ATM);

a receiving section, connected to said physical layer device, for receiving said reception cells supplied from said network via said physical layer device, said receiving section including a memory for selectively storing the reception cells as stored cells, said receiving section carrying out, on the basis of a value of the identifier in the header field of each of the reception cells, decision of reception, verification for various errors, and reassembly of a reception packet constituted by a plurality of reception cells;

a transmitting section, connected to said physical layer device, for carrying out cell segmentation of a transmission packet constituted by a plurality of transmission cells to be transmitted and rate control for the transmission cells, said transmitting section transmitting the transmission cells to said network via said physical layer device; and a direct memory access (DMA) controller, connected to said receiving section, said transmitting section, and a system bus, for interfacing said receiving section and said transmitting section with said system bus, said receiving section further comprising:

address filtering means, connected to said physical layer device, for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; wherein:

the particular address consisting of a LAN emulation client (LEC) ID and a medium access control (MAC) address, said receiving section including a cell information table for storing cell information every channel, wherein said address filtering means comprises:

an address storing section, connected to said physical layer device, for storing data including the particular address in the payload of the payload field as stored data;

an address extracting section, connected to said address storing section, for extracting the LEC ID and the MAC address from the stored data to produce an extracted LEC ID and an extracted MAC address;

LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and MAC address filtering means, connected to said address extracting section, for carrying out an MAC address filtering on the basis of the extracted MAC address;

wherein said MAC address filtering means comprises:
- a first MAC address filtering section for carrying out a broadcast filtering on the extracted MAC address for a broadcast to produce a first MAC address filtered signal;
- a second MAC address filtering section for carrying out a unicast filtering on the extracted MAC address for a unicast to produce a second MAC address filtered signal; and
- a third MAC address filtering section for carrying out a multicast filtering on the extracted MAC address for a multicast to produce a third MAC address filtered signal; and wherein said receiving section includes:
- a cell payload storing section, connected to said physical layer device, for storing the payload in the payload field of each of the reception cells as a stored payload;
- a selector, connected to said cell payload storing section and said address extracting section, for selecting one of the stored payload and the extracted MAC address as selected data; and
- verification section, connected to said selector, for carrying out not only verification for an error correcting code on the stored payload and but also calculation of an error correcting code of the extracted MAC address, said verification section producing a calculated result indicative of the error correcting code of the extracted MAC address,
- wherein said third MAC address filtering section comprises an MAC address hashing section, connected to said verification section, for hashing the calculated result to produce a hashed result as the third MAC address filtered signal.

6. A communication control apparatus as claimed in claim 5, wherein said write-in control means writes the reception packet in said memory when the hashed result indicates that a hash hits.

7. A receiving unit for receiving reception cells each of which has a header field assigned with an identifier and a payload field assigned with a payload, said receiving unit including a memory for selectively storing the reception cells as stored cells, said receiving unit carrying out, on the basis of a value of the identifier in the header field of each of the reception cells, decision of reception, verification for various errors, and reassembly of a reception packet, said receiving unit further comprising:

address filtering means for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; and wherein the particular address consists of a LAN emulation client (LEC) ID and a medium access control (MAC) address, said receiving unit including a cell information table for storing cell information every channel, wherein said address filtering means comprises:
- an address storing section, connected to said physical layer device, for storing data including the particular address in the payload of the payload field as stored data;
- an address extracting section, connected to said address storing section, for extracting the LEC ID and the MAC address from the stored data to produce an extracted LEC ID and an extracted MAC address;
- LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and
- MAC address filtering means, connected to said address extracting section, for carrying out an MAC address filtering on the basis of the extracted MAC address; and wherein said MAC address filtering means comprises:
- a first MAC address filtering section for carrying out a broadcast filtering on the extracted MAC address for a broadcast to produce a first MAC address filtered signal;
- a second MAC address filtering section for carrying out a unicast filtering on the extracted MAC address for a unicast to produce a second MAC address filtered signal; and
- a third MAC address filtering section for carrying out a multicast filtering on the extracted MAC address for a multicast to produce a third MAC address filtered signal; and wherein said first MAC address filtering section comprises an AND circuit, connected to said address extracting section, for ANDing the extracted MAC address bit by bit to produce an ANDed result as the first MAC address filtered signal.

8. A receiving unit as claimed in claim 7, wherein said write-in control means writes the reception packet in said memory when the ANDed result has a logic high level.

9. A receiving unit for receiving reception cells each of which has a header field assigned with an identifier and a payload field assigned with a payload, said receiving unit including a memory for selectively storing the reception cells as stored cells, said receiving unit carrying out, on the basis of a value of the identifier in the header field of each of the reception cells, decision of reception, verification for various errors, and reassembly of a reception packet, said receiving unit further comprising:

address filtering means for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; and wherein the particular address consists of a LAN emulation client (LEC) ID and a medium access control (MAC) address, said receiving unit including a cell information table for storing cell information every channel, wherein said address filtering means comprises:

an address storing section, connected to said physical layer device, for storing data including the particular address in the payload of the payload field as stored data;

an address extracting section, connected to said address storing section, for extracting the LEC ID and the MAC address from the stored data to produce an extracted LEC ID and an extracted MAC address;

LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and MAC address filtering means, connected to said address extracting section, for carrying out an MAC address filtering on the basis of the extracted MAC address; and wherein said MAC address filtering means comprises:

a first MAC address filtering section for carrying out a broadcast filtering on the extracted MAC address for a broadcast to produce a first MAC address filtered signal;

a second MAC address filtering section for carrying out a unicast filtering on the extracted MAC address for a unicast to produce a second MAC address filtered signal; and a third MAC address filtering section for carrying out a multicast filtering on the extracted MAC address for a multicast to produce a third MAC address filtered signal; and wherein said third MAC address filtering section comprises:

a calculation section, connected to said address extracting section, for calculating an error correcting code of the extracted MAC address to produce a calculated result indicative of the error correcting code; and an MAC address hashing section, connected to said calculation section, for hashing the calculated result to produce a hashed result as the third MAC address filtered signal.

10. A receiving unit as claimed in claim 9, wherein said write-in control means writes the reception packet in said memory when the hashed result indicates that a hash hits.

11. A receiving unit for receiving reception cells each of which has a header field assigned with an identifier and a payload field assigned with a payload, said receiving unit including a memory for selectively storing the reception cells as stored cells, said receiving unit carrying out, on the basis of a value of the identifier in the header field of each of the reception cells, decision of reception, verification for various errors, and reassembly of a reception packet, said receiving unit further comprising:

address filtering means for identifying a value of a particular address in the payload included in the payload field of a first cell for the reception packet to produce an address filtered signal indicative of an identified value; and write-in control means, connected to said address filtering means and said memory, for determining whether or not the reception packet should be received on the basis of the identified value indicated by the address filtered signal, said write-in control means writing the reception packet in said memory when the reception packet should be received, said write-in control means sequentially discarding all of the reception packet without writing any portion of the reception packet into said memory when the reception packet should not be received; and wherein the particular address consists of a LAN emulation client (LEC) ID and a medium access control (MAC) address, said receiving unit including a cell information table for storing cell information every channel, wherein said address filtering means comprises:

an address storing section, connected to said physical layer device, for storing data including the particular address in the payload of the payload field as stored data;

an address extracting section, connected to said address storing section, for extracting the LEC ID and the MAC address from the stored data to produce an extracted LEC ID and an extracted MAC address;

LEC ID filtering means, connected to said cell information table and said address extracting section, for carrying out an LEC ID filtering on the basis of the extracted LEC ID and an LEC ID for the channel of the first cell that is read out of said cell information table to produce an LEC ID filtered signal; and MAC address filtering means, connected to said address extracting section, for carrying out an MAC address filtering on the basis of the extracted MAC address; and wherein said MAC address filtering means comprises:

a first MAC address filtering section for carrying out a broadcast filtering on the extracted MAC address for a broadcast to produce a first MAC address filtered signal;

a second MAC address filtering section for carrying out a unicast filtering on the extracted MAC address for a unicast to produce a second MAC address filtered signal; and a third MAC address filtering section for carrying out a multicast filtering on the extracted MAC address for a multicast to produce a third MAC address filtered signal; and wherein:

said receiving unit includes:

a cell payload storing section, connected to said physical layer device, for storing the payload in the payload field of each of the reception cells as a stored payload;

a selector, connected to said cell payload storing section and said address extracting section, for selecting one of the stored payload and the extracted MAC address as selected data; and a verification section, connected to said selector, for carrying out not only verification for an error correcting code on the stored payload and but also calculation of an error correcting code of the extracted MAC address, said verification section producing a calculated result indicative of the error correcting code of the extracted MAC address, wherein said third MAC address filtering section comprises an MAC address hashing section, connected to said verification section, for hashing the calculated result to produce a hashed result as the third MAC address filtered signal.

12. A receiving unit as claimed in claim 11, wherein said write-in control means writes the reception packet in said memory when the hashed result indicates that a hash hits.

* * * * *